(12) United States Patent
Fujiwara et al.

(10) Patent No.: US 10,279,398 B2
(45) Date of Patent: May 7, 2019

(54) DRILL

(71) Applicant: Mitsubishi Hitachi Tool Engineering, Ltd., Tokyo (JP)

(72) Inventors: Shigeyoshi Fujiwara, Yasu (JP); Teruaki Niwa, Yasu (JP)

(73) Assignee: Mitsubishi Hitachi Tool Engineering, Ltd., Tokyo (JP)

( * ) Notice: Subject to any disclaimer, the term of this patent is extended or adjusted under 35 U.S.C. 154(b) by 0 days.

(21) Appl. No.: 15/554,503

(22) PCT Filed: Mar. 17, 2016

(86) PCT No.: PCT/JP2016/058549
§ 371 (c)(1),
(2) Date: Aug. 30, 2017

(87) PCT Pub. No.: WO2016/158463
PCT Pub. Date: Oct. 6, 2016

(65) Prior Publication Data
US 2018/0043441 A1 Feb. 15, 2018

(30) Foreign Application Priority Data
Mar. 30, 2015 (JP) .................................. 2015-069419

(51) Int. Cl.
*B23B 51/02* (2006.01)
*B23B 51/06* (2006.01)

(52) U.S. Cl.
CPC .............. *B23B 51/02* (2013.01); *B23B 51/06* (2013.01); *B23B 2251/04* (2013.01);
(Continued)

(58) Field of Classification Search
CPC ................ B23B 51/02; B23B 2251/04; B23B 2251/082; B23B 2251/14; B23B 2251/408; B23B 2251/443; Y10T 408/9097
See application file for complete search history.

(56) References Cited

U.S. PATENT DOCUMENTS 3,443,459 A * 5/1969 Mackey, Jr. ............ B23B 51/02
408/230
4,116,580 A * 9/1978 Hall ........................ B23B 51/02
407/54
(Continued)

FOREIGN PATENT DOCUMENTS

| CA | 2525278 A1 | 11/2004 |
| CN | 202861476 U * | 4/2013 |

(Continued)

OTHER PUBLICATIONS

International Search Report dated Apr. 26, 2016, issued for PCT/JP2016/058549 and English translation thereof.
(Continued)

*Primary Examiner* — Eric A Gates
(74) *Attorney, Agent, or Firm* — Locke Lord LLP

(57) ABSTRACT

A drill of the present invention includes: a drill main body; a plurality of convex-arc cutting edges which are formed on a tip side of the drill main body from an outer periphery of the drill main body to a chisel edge provided near to a rotational axis; second faces which are each formed in an approximately band shape and are each formed along each of the convex-arc cutting edges on a back side of the convex-arc cutting edge in the rotational direction; third faces which are each formed to be continuous with a back side of each of the second faces in the rotational direction; and fourth faces which are each formed to be continuous
(Continued)

with a back side of each of the third faces in the rotational direction.

20 Claims, 6 Drawing Sheets

(52) U.S. Cl.
CPC ..... *B23B 2251/082* (2013.01); *B23B 2251/14* (2013.01); *B23B 2251/40* (2013.01); *B23B 2251/408* (2013.01); *B23B 2251/443* (2013.01); *Y10T 408/9097* (2015.01)

(56) References Cited

U.S. PATENT DOCUMENTS

| | | | | |
|---|---|---|---|---|
| 5,486,075 | A * | 1/1996 | Nakamura | B23B 51/02 408/224 |
| 5,716,172 | A * | 2/1998 | Nakamura | B23B 51/02 408/227 |
| 6,071,046 | A * | 6/2000 | Hecht | B23B 51/02 408/224 |
| 6,132,149 | A * | 10/2000 | Howarth | B23B 51/02 408/229 |
| 6,676,342 | B2 * | 1/2004 | Mast | B23B 51/02 408/144 |
| 6,916,139 | B2 * | 7/2005 | Yanagida | B23B 51/02 408/227 |
| 7,296,954 | B2 * | 11/2007 | Haenle | B23B 51/009 408/227 |
| 7,575,401 | B1 * | 8/2009 | Garrick | B23B 51/02 408/145 |
| 9,004,825 | B2 * | 4/2015 | Gruber | B23B 51/02 408/1 R |
| 9,114,461 | B2 * | 8/2015 | Olsson | B23B 51/02 |
| 2006/0037786 | A1 | 2/2006 | Takikawa | |
| 2006/0039767 | A1 * | 2/2006 | Yamamoto | B23B 51/02 408/230 |
| 2010/0322726 | A1 * | 12/2010 | Glimpel | B23B 51/02 408/57 |
| 2014/0294529 | A1 | 10/2014 | Takai | |
| 2015/0043983 | A1 | 2/2015 | Gass et al. | |

FOREIGN PATENT DOCUMENTS

| | | | |
|---|---|---|---|
| DE | 19602566 A1 * | 7/1997 | ............. B23B 51/02 |
| DE | 102009030689 A1 * | 12/2009 | ............. B23B 51/02 |
| JP | 55031535 A * | 3/1980 | |
| JP | 55031536 A * | 3/1980 | |
| JP | 57071714 A * | 5/1982 | |
| JP | 60-056809 A | 4/1985 | |
| JP | 63216610 A * | 9/1988 | |
| JP | 63237807 A * | 10/1988 | |
| JP | 63237808 A * | 10/1988 | |
| JP | 01140908 A * | 6/1989 | |
| JP | 02-109620 A | 4/1990 | |
| JP | 04025308 A * | 1/1992 | |
| JP | 06015512 A * | 1/1994 | |
| JP | 06320316 A * | 11/1994 | |
| JP | 09038816 A * | 2/1997 | |
| JP | 09-136206 A | 5/1997 | |
| JP | 10058291 A * | 3/1998 | |
| JP | 2001079707 A * | 3/2001 | |
| JP | 2005-199418 A | 7/2005 | |
| JP | 2006-525127 A | 11/2006 | |
| JP | 2008149412 A * | 7/2008 | |
| JP | 2011073129 A * | 4/2011 | |
| JP | 2012-121137 A | 6/2012 | |
| JP | 2014-083646 A | 5/2014 | |
| WO | WO 2005030418 A1 * | 4/2005 | ............. B23B 51/02 |
| WO | WO 2007083967 A1 * | 7/2007 | ............. B23B 51/02 |
| WO | 2013/065201 A1 | 5/2013 | |

OTHER PUBLICATIONS

Search Report dated Oct. 22, 2018, issued for the European patent application No. 16772346.9.

* cited by examiner

DRILL

TECHNICAL FIELD

The present invention relates to a drill which can obtain a high-quality machined face.

Priority is claimed on Japanese Patent Application No. 2015-069419, filed on Mar. 30, 2015, the content of which is incorporated herein by reference.

BACKGROUND ART

Improved hole machining accuracy is required in a drill which is used for drilling in die machining or part machining. Various studies have been made in order to obtain improved machined face quality and machining accuracy.

In the related art, a drill is known in which a cutting edge is formed to be convex in a direction toward a tip of the drill so as to disperse a cutting resistance to obtain a high-quality machined face. PTL 1 discloses a drill in which a cutting edge has a continuous convex shape from a cutting corner portion toward a tip in an axial direction and which has a two-staged flank face.

In addition, various thinning is performed on the tip of the drill in order to decrease a biting load or a thrust load with respect to a work material. PTL 2 discloses a drill which can realize high-accuracy drilling by forming an incision (thinning) to a position beyond a center of a tool so as to form a thinning cutting edge.

PTL 3 discloses a drill which has a main margin and a sub margin and in which a thinning face is formed over the entire region from an inner end of a cutting edge in a radial direction to an outer end thereof in the radial direction to increase a fracture resistance of the cutting edge.

CITATION LIST

Patent Literature

[PTL 1] Japanese Unexamined Patent Application, First Publication No. 2012-121137
[PTL 2] Japanese Unexamined Patent Application, First Publication No. S60-56809
[PTL 3] Japanese Unexamined Patent Application, First Publication No. 2014-83646

SUMMARY OF INVENTION

Technical Problem

However, in each of the drills disclosed in PTLs 1 to 3, clogging of chips easily occurs when a feed speed increases, and a cutting resistance increases since a contact time of the cutting edge with respect to a work material is prolonged. Therefore, there is room for improvement.

In order to solve the above-described problems, an objective of the present invention is to provide a drill which can stably obtain a high-quality machined face by decreasing clogging of chips and chattering vibrations during drilling.

Solution to Problem

In order to achieve the above-described objective, according to an aspect of the present invention, a drill is provided, including: a drill main body; a plurality of convex-arc cutting edges which are formed on a tip side of the drill main body from an outer periphery of the drill main body to a chisel edge provided near to a rotational axis; thinnings which are each formed between the convex-arc cutting edges; flutes which are each formed from a posterior end of each of the thinnings in a direction of the rotational axis toward a posterior end side of the drill main body; first margins which are each formed along an outer peripheral end of the drill main body on a back side of each of the flutes in a rotational direction; and second margins which are each formed along the outer peripheral end of the drill main body on a forward side of each of the flutes in the rotational direction, in which the drill further includes: second faces which are each formed in an approximately band shape and are each formed along each of the convex-arc cutting edges on a back side of the convex-arc cutting edge in the rotational direction; third faces which are each formed to be continuous with a back side of each of the second faces in the rotational direction; and fourth faces which are each formed to be continuous with a back side of each of the third faces in the rotational direction.

According to the above-described characteristics, compared with the conventional drill, it is possible to decrease a load applied to the edge tip during cutting, and it is possible to widen a chip discharge region and to obtain a high-quality machined face.

In the drill of the present invention, preferably, a maximum width of each of the second faces which are formed in an approximately band shape is within a range of 0.02 to 0.1D, where D is a diameter of the drill. According to this configuration, compared with the conventional drill, the chip discharge region is widened and chip discharge performance is remarkably improved.

In the drill of the present invention, preferably, a second angle $\alpha$ is 10° to 30°, a third angle $\beta$ is 25° to 45°, and a fourth angle $\gamma$ is 50° to 70°. According to this configuration, a cutting resistance in the drill of the present invention decreases and high rigidity is obtained.

In a case where the drill of the present invention is viewed from the tip side of the drill main body, preferably, each of boundaries between the thinnings and the third faces forms an angle of 80° to 110° with respect to each of ridgelines of the convex-arc cutting edges. In other words, preferably, each of boundaries between the thinnings and the third faces forms an angle of 80° to 110° with respect to the cutting edge (the ridgeline of the cutting edge) positioned on the back side of the thinning in the radial direction. According to this configuration, since the thinning face can be largely formed, it is possible to improve chip discharge performance.

In a case where the drill of the present invention is viewed from the tip side of the drill main body, preferably, boundaries between the thinnings and the third faces are formed in straight lines. According to this configuration, effects of dividing chips generated from the cutting edges are increased, and it is possible to perform drilling with higher efficiency.

In the drill of the present invention, preferably, a terminal end of a rake face of each of the convex-arc cutting edges is positioned on a back side of a beginning of each of the first margins in the rotational direction. According to this configuration, a finish cutting region is formed between the cutting edge and the first margin, and it is possible to further improve the machined face quality.

In a case where the drill of the present invention is viewed from the tip side of the drill main body, preferably, a diameter of a circle inscribed in boundaries between the thinnings and the flutes is 30% to 50% of a diameter of the drill. According to this configuration, it is possible to prevent breaking of the drill and to stably perform the machining.

In the drill of the present invention, preferably, a tip side of each of the thinnings is continuous with the back side of each of the third faces in the rotational direction, a posterior end side of each of the thinnings is continuous with a back side of each of the fourth faces in the rotational direction, and in a case where the drill main body is viewed from the tip side thereof, each of boundaries between the thinnings and the third faces forms an angle of 35° to 55° with each of boundaries between the thinnings and the fourth faces. According to this configuration, it is possible to secure chip discharge performance and rigidities of the second margins.

In the drill of the present invention, preferably, each of the thinnings is continuous with a back side of each of the fourth faces in the rotational direction, and in a case where the drill main body is viewed from the tip side thereof, a distance from the rotational axis to an outermost point in a radial direction which is located on boundaries between the thinnings and the fourth faces is 0.2D to 0.45D, where D is a diameter of the drill. According to this configuration, since it is possible to widen the thinnings while improving the strength of the second margins, it is possible to improve chip discharge performance.

In a case where the drill of the present invention is viewed from the tip side of the drill main body, preferably, the distance from the rotational axis to the outermost point in a radial direction which is located on the boundaries between the thinnings and the convex-arc cutting edges is 0.25D to 0.5D, where D is a diameter of the drill. According to this configuration, since it is possible to widen the thinnings, it is possible to improve chip discharge performance.

In the drill of the present invention, preferably, each of the second margins is continuous with a posterior end of each of the fourth faces in the direction of the rotational axis. According to this configuration, since it is possible to widen the widths of the second margins, it is possible to improve stability during cutting.

In the drill of the present invention, preferably, in the direction of the rotational axis, a posterior end of a rake face of each of the convex-arc cutting edges is positioned at the posterior end side of the drill main body with respect to a tip of each of the first margins. According to this configuration, it is possible to obtain a high-quality hole machined surface. In addition, in this case, preferably, in a case where the drill of the present invention is viewed from the tip side of the drill main body, a distance between the posterior end of the rake face in the direction of the rotational axis and the tip of each of the first margins in the direction of the rotational axis is 0.03D to 0.3D, where D is a diameter of the drill.

In the drill of the present invention, preferably, each of the first margins is continuous with a posterior end of each of the third faces in the direction of the rotational axis, and a width of each of the first margins is gradually increased from a tip of each of the first margins in the direction of the rotational axis to a posterior end of each of boundaries between the first margins and the third faces in the direction of the rotational axis. According to this configuration, it is possible to decrease a load during cutting.

In the drill of the present invention, preferably, each of the first margins is continuous with a posterior end of each of the second faces and a posterior end of each of the third faces in the direction of the rotational axis, and boundaries between the first margins and the second faces and boundaries between the first margins and the third faces are circular arcs which are convex forward in the rotational direction. According to this configuration, it is possible to further decrease a load during cutting.

In the drill of the present invention, preferably, a rake angle of each of the convex-arc cutting edges is −5° to 0.5° in a range of 0.03D to 0.35D in the direction of the rotational axis from a tip of the drill main body, where D is a diameter of the drill. According to this configuration, it is possible to secure rigidity of the edge tip.

Advantageous Effects of Invention

The drill of the present invention includes: the second faces which are each formed in an approximately band shape and are each formed along each of the convex-arc cutting edges on a back side of the convex-arc cutting edge in the rotational direction; and third faces and fourth faces which are each formed to be continuous with the back side of each of the second faces in the rotational direction. Accordingly, compared with the conventional drill which does not include: the second faces which are each formed in an approximately band shape and are each formed along each of the convex-arc cutting edges on a back side of the convex-arc cutting edge in the rotational direction; and third faces and fourth faces which are each formed to be continuous with the back side of each of the second faces in the rotational direction, it is possible to obtain high chip discharge performance while securing the rigidity of the edge tip. As a result, it is possible to obtain a high-quality machined face.

DESCRIPTION OF EMBODIMENTS

Figure 1:
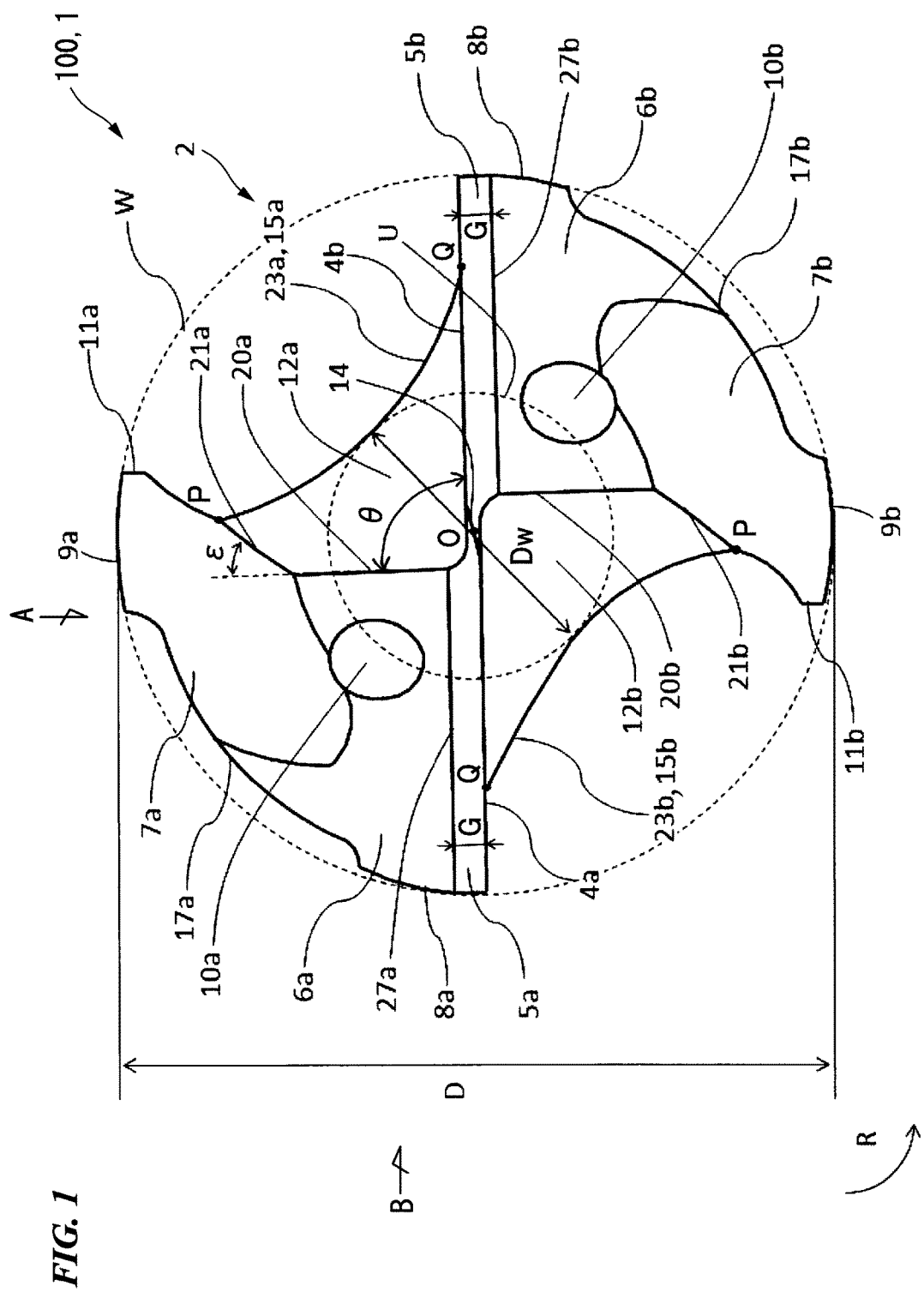
FIG. 1 is a front view when a drill according to an embodiment of the present invention is viewed from a cutting edge side.

Hereinafter, an embodiment (hereinafter, referred to as the present embodiment) of the present invention will be described with FIGS. 1 to 6, taking a two-flute drill as an example. Here, in the present specification, a "rotational axis" means a rotational axis of a drill or a drill main body, a "tip side" means a side on which a cutting edge of the drill main body is formed in a direction of the rotational axis, and a "posterior end side" is a side opposite to the tip side in the direction of the rotational axis. A "rotational direction" means a rotational direction of the drill or the drill main body, and a "radial direction" means a direction which passes through the rotational axis and is perpendicular to the rotational axis. An "outer periphery" means the outside of the drill in the radial direction.

A drill 100 of the present embodiment includes: a plurality of convex-arc cutting edges 4a and 4b which are formed on a tip portion 2 of a drill main body 1 from an outer periphery of the drill main body 1 to a chisel edge 14 provided near to a rotational axis O; thinnings 12a and 12b which are each formed between the convex-arc cutting edges 4a and 4b; flutes 15a and 15b which are each formed from a posterior end of each of the thinnings 12a and 12b in a direction of the rotational axis O toward a posterior end side of the drill main body 1; first margins 8a and 8b which are each formed along an outer peripheral end W of the drill main body 1 on the back side of each of the flutes 15a and 15b in a rotational direction R; and second margins 9a and 9b which are each formed along the outer peripheral end W on a forward side of each of the flutes 15a and 15b in the rotational direction R. The drill 100 further includes: second faces 5a and 5b which each have an approximately band shape and are each formed on a back side of each of the convex-arc cutting edges 4a and 4b in the rotational direction R along each of the convex-arc cutting edges 4a and 4b; third faces 6a and 6b which are each formed to be continuous with a back side of each of the second faces 5a and 5b in the rotational direction R; and fourth faces 7a and 7b which are each formed to be continuous with a back side of each of the third faces 6a and 6b in the rotational direction R.

In order to obtain a higher-quality machined face, cutting edges of the drill 100 of the present embodiment are convex-arc cutting edges 4a and 4b which are each formed in a convex-arc shape from the outer periphery of the tip portion 2 of the drill main body 1 to the chisel edge 14 provided near to the rotational axis O (provided near to a tip 50 of the drill main body 1 which is an intersection between the drill main body 1 and a tip side of the rotational axis O). Preferably, the number of cutting edges is two to four. In a case where the number of cutting edges is less than two, machining efficiency decreases, and in a case where the number of cutting edges exceeds four, a chip discharge region is narrowed, and there is a concern that clogging of chips easily occurs during drilling.

Figure 2:
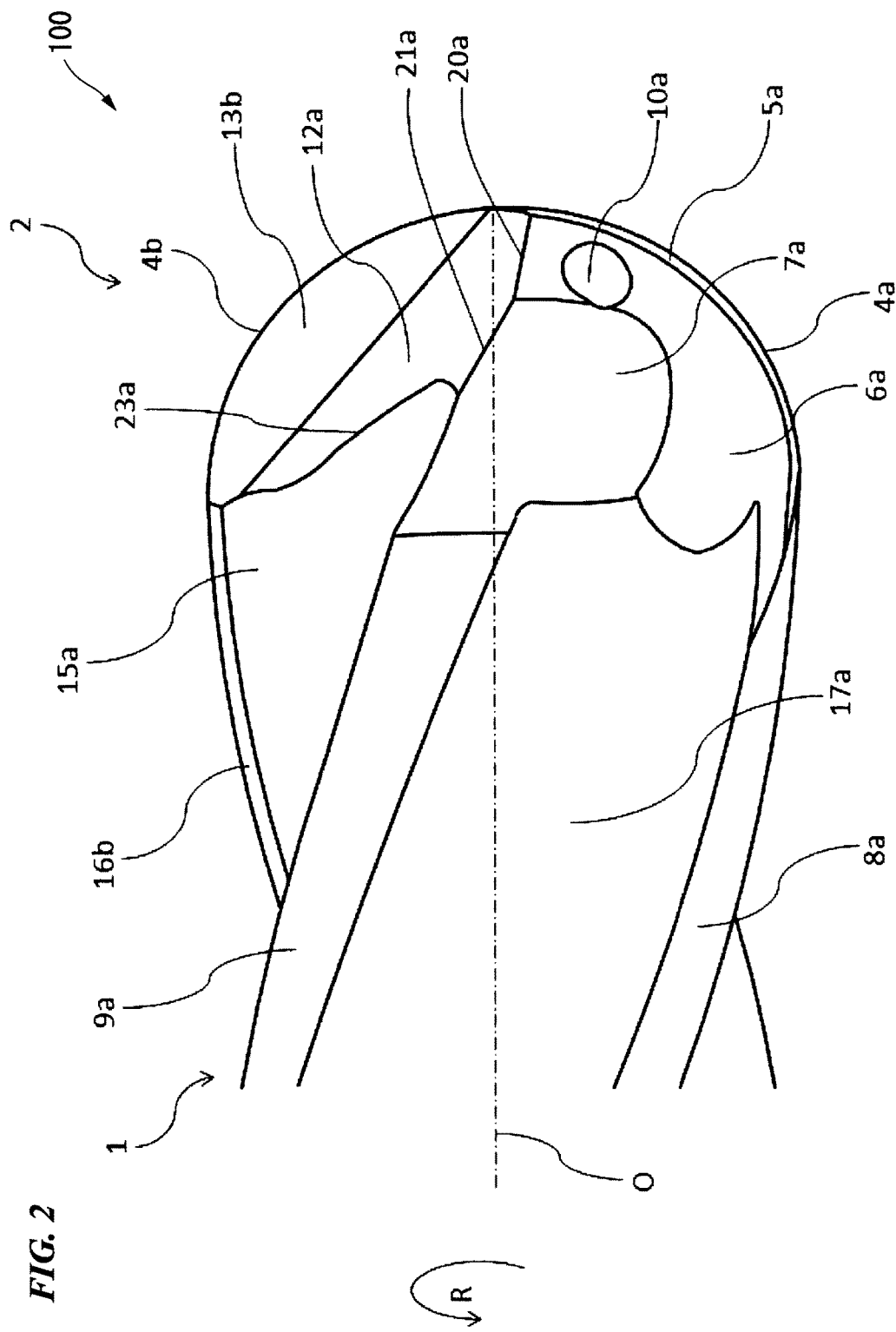
FIG. 2 is a side view (a view in the direction of arrow A in FIG. 1) of the drill in FIG. 1.

As shown in FIGS. 1 and 2, the drill 100 of the present invention includes a drill main body 1. The drill main body 1 has a shape which is rotationally symmetrical by 180° with respect to the rotational axis O of the drill 100. Two convex-arc cutting edges 4a and 4b are formed along the rotational axis O on the tip portion 2 positioned on the tip side of the drill main body 1 (right side in FIG. 2). Each of the two cutting edges 4a and 4b extend in a convex-arc shape from the outer periphery of the tip portion 2 to the chisel edge 14 on a virtual plane parallel to the rotational axis O. The drill main body 1 has a columnar shank portion (not shown) which is formed on a posterior end side of the tip portion 2 (left side in FIG. 2).

Figure 6:
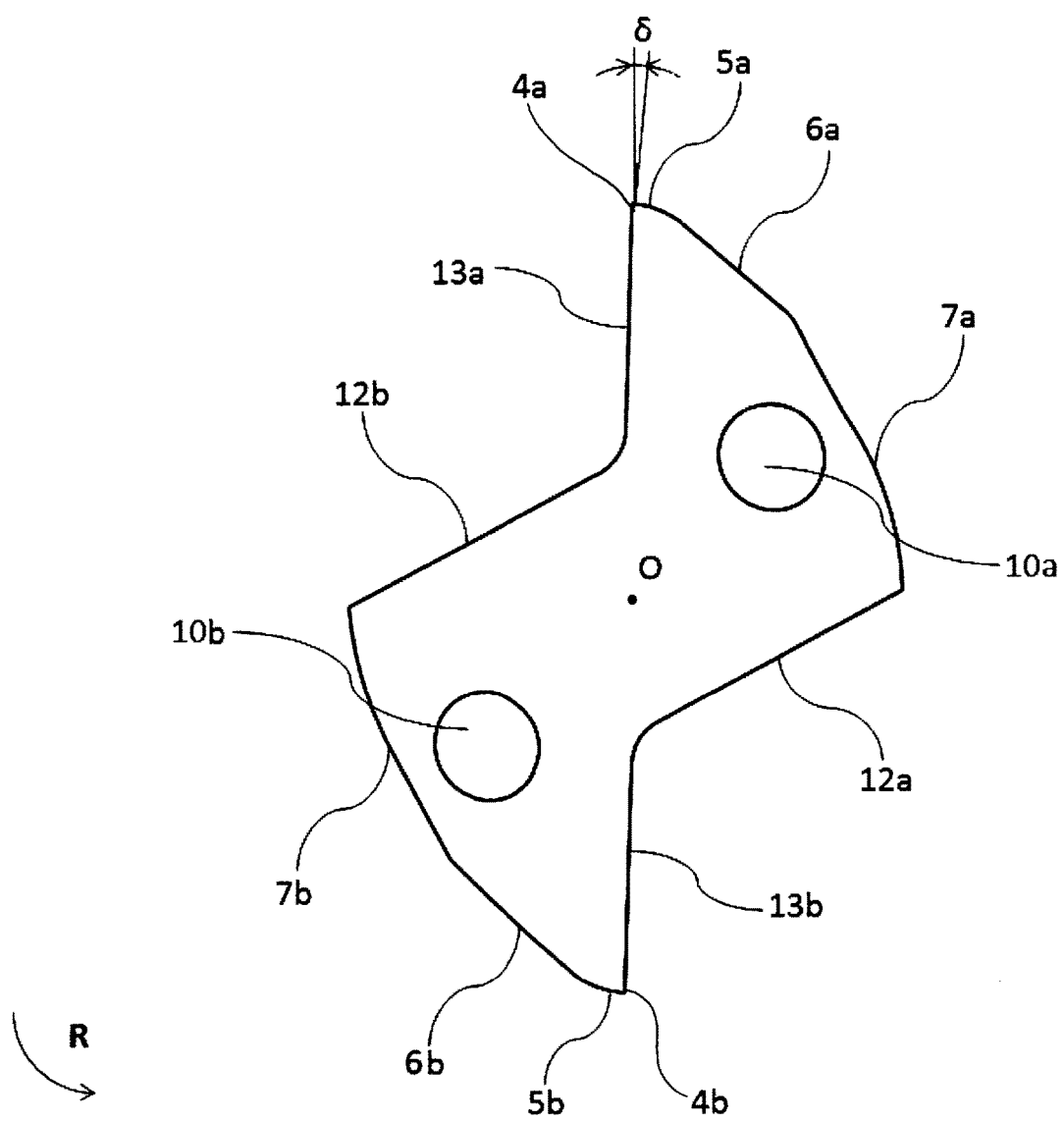
FIG. 6 is a sectional view taken along line I-I of FIG. 3.

Each of rake faces 13a and 13b is formed on the forward side of each of the cutting edges 4a and 4b in the rotational direction R of the drill main body 1. Each of the rack faces 13a and 13b is a flat face which is surrounded by each of the cutting edges 4a and 4b (each of ridgelines of the cutting edges 4a and 4b) and a straight line which connects the posterior end of each of the cutting edges 4a and 4b in the direction of the rotational axis O and the end portion of the chisel edge 14 to each other. As shown in FIG. 6, each of the rake faces 13a and 13b has a predetermined rake angle δ.

Figure 3:
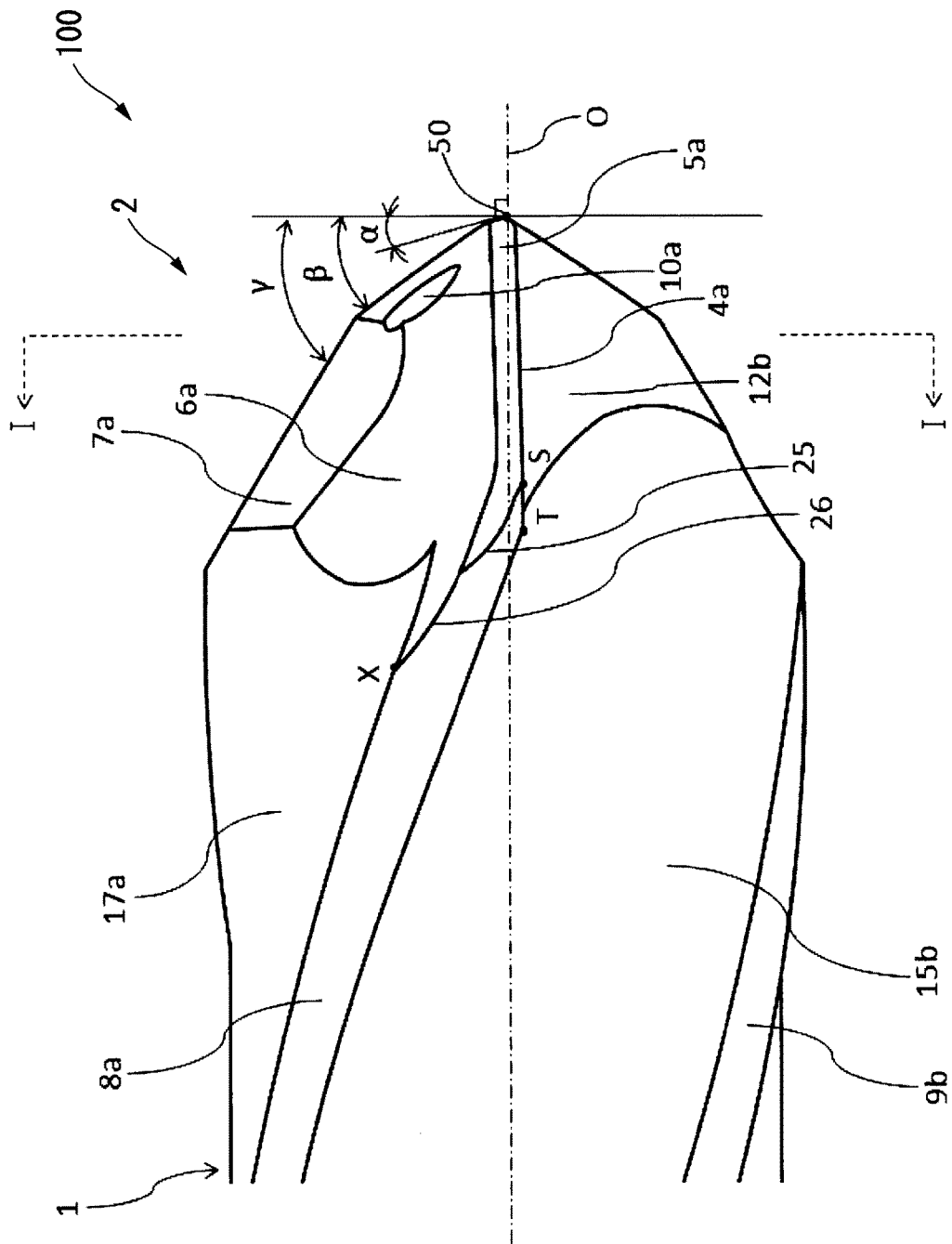
FIG. 3 is a side view (a view in the direction of arrow B in FIG. 1) when the drill of FIG. 1 is viewed at an angle different from that of FIG. 2.

Each of the second faces 5a and 5b is formed to be continuous with the back side of each of the cutting edges 4a and 4b in the rotational direction R, and the second faces 5a and 5b are connected to each other via the chisel edge 14. In FIG. 1, each of the second edges 5a and 5b are formed in an approximately band shape along each of the convex-arc cutting edge 4a and 4b from the outer periphery of the tip portion 2 of the drill main body 1 to the chisel edge 14 provided near to the rotational axis O (provided near to the tip 50 of the drill main body 1). As shown in FIG. 3, each of the second faces 5a and 5b has a predetermined second angle α (a flank angle in the direction of the rotational axis O and an angle formed between a face perpendicular to the rotational axis O and each of the second faces 5a and 5b).

Each of the third faces 6a and 6b is formed to be continuous with the back side of each of the second faces 5a and 5b in the rotational direction R. As shown in FIGS. 2 and 3, each of the third faces 6a and 6b extends from each of lines (27a and 27b) defining back ends of the second faces 5a and 5b in the rotational direction R to the back side of each of the second faces 5a and 5b in the rotational direction R and to the posterior end side of each thereof in the direction of the rotational axis O. Each of oil holes 10a and 10b is open to each of the third faces 6a and 6b. Each of the oil holes 10a and 10b is a through-hole which extends in the direction of the rotational axis O inside the drill main body 1. As shown in FIG. 3, each of the third faces 6a and 6b has a predetermined third angle β (which is a flank angle in the direction of the rotational axis O and an angle between the face perpendicular to the rotational axis O and each of the third faces 6a and 6b). As described below, the third angle β is larger than the second angle α.

Figure 4:
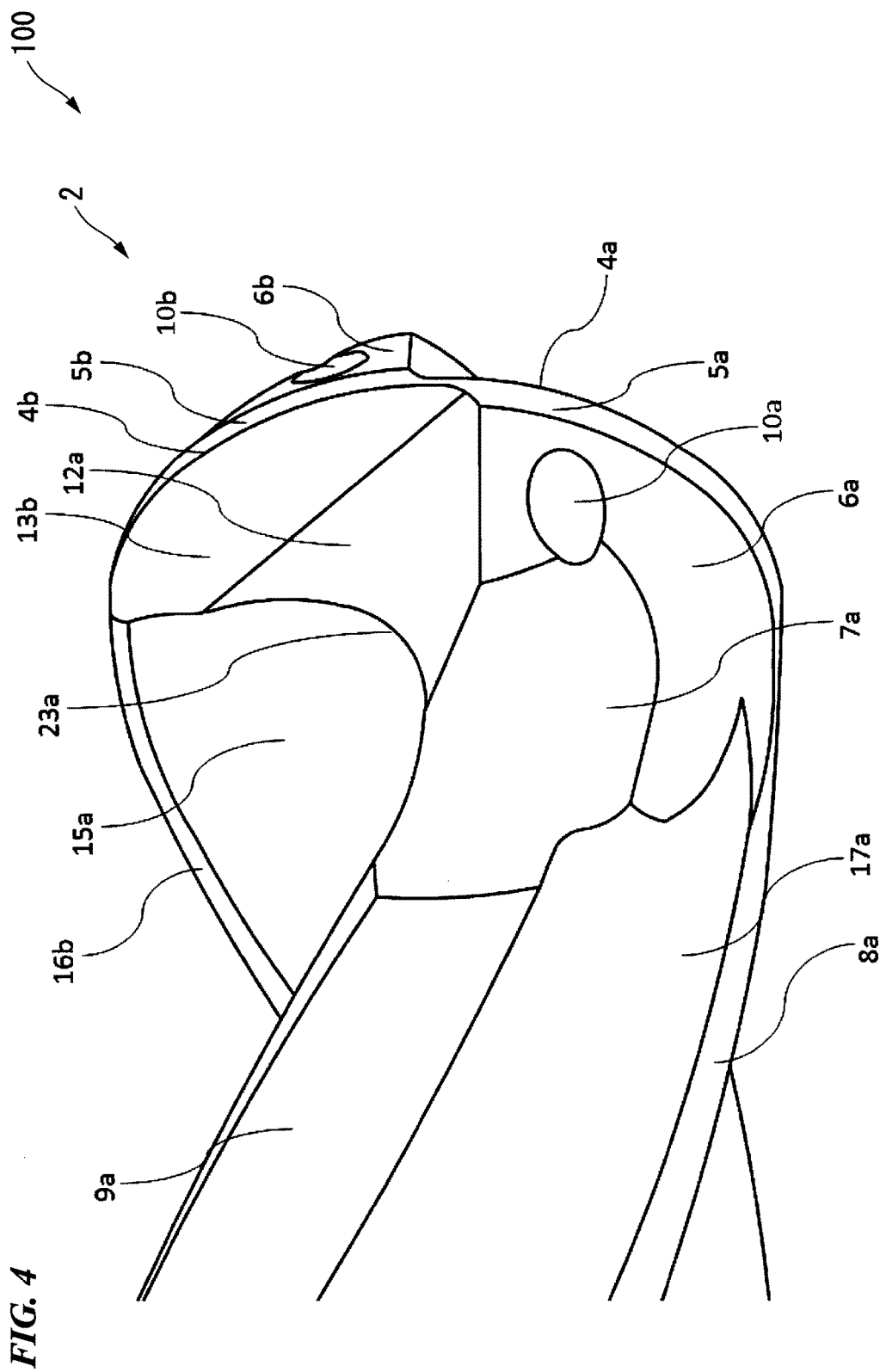
FIG. 4 is a perspective view of the drill of FIG. 3.

Each of the fourth faces 7a and 7b is formed to be continuous with the back side of each of the third faces 6a and 6b in the rotational direction R. More specifically, each of the fourth faces 7a and 7b is connected to the back side of each of the third faces 6a and 6b in the rotational direction R and the posterior end side of each thereof in the direction of the rotational axis O. As shown in FIGS. 1, 2, and 4, each of lines (21a and 21b) defining the back ends of the fourth faces 7a and 7b in the rotational direction R is continuous with each of lines (20a and 20b) defining the back ends of the third faces 6a and 6b in the rotational direction R, and an approximately fan-shaped region is formed by the third faces 6a and 6b and the fourth faces 7a and 7b. As shown in FIG. 3, each of the fourth faces 7a and 7b has a predetermined fourth angle γ (which is a flank angle in the direction of the rotational axis O and is an angle between the face perpendicular to the rotational axis O and each of the fourth faces 7a and 7b). As described below, the fourth angle γ is larger than the third angle β.

The second faces 5a and 5b, the third faces 6a and 6b, and the fourth faces 7a and 7b are formed in this order on the back sides of the convex-arc cutting edges 4a and 4b in the rotational direction R, respectively, and these faces function as flank faces of the convex-arc cutting edges 4a and 4b.

Figure 5:
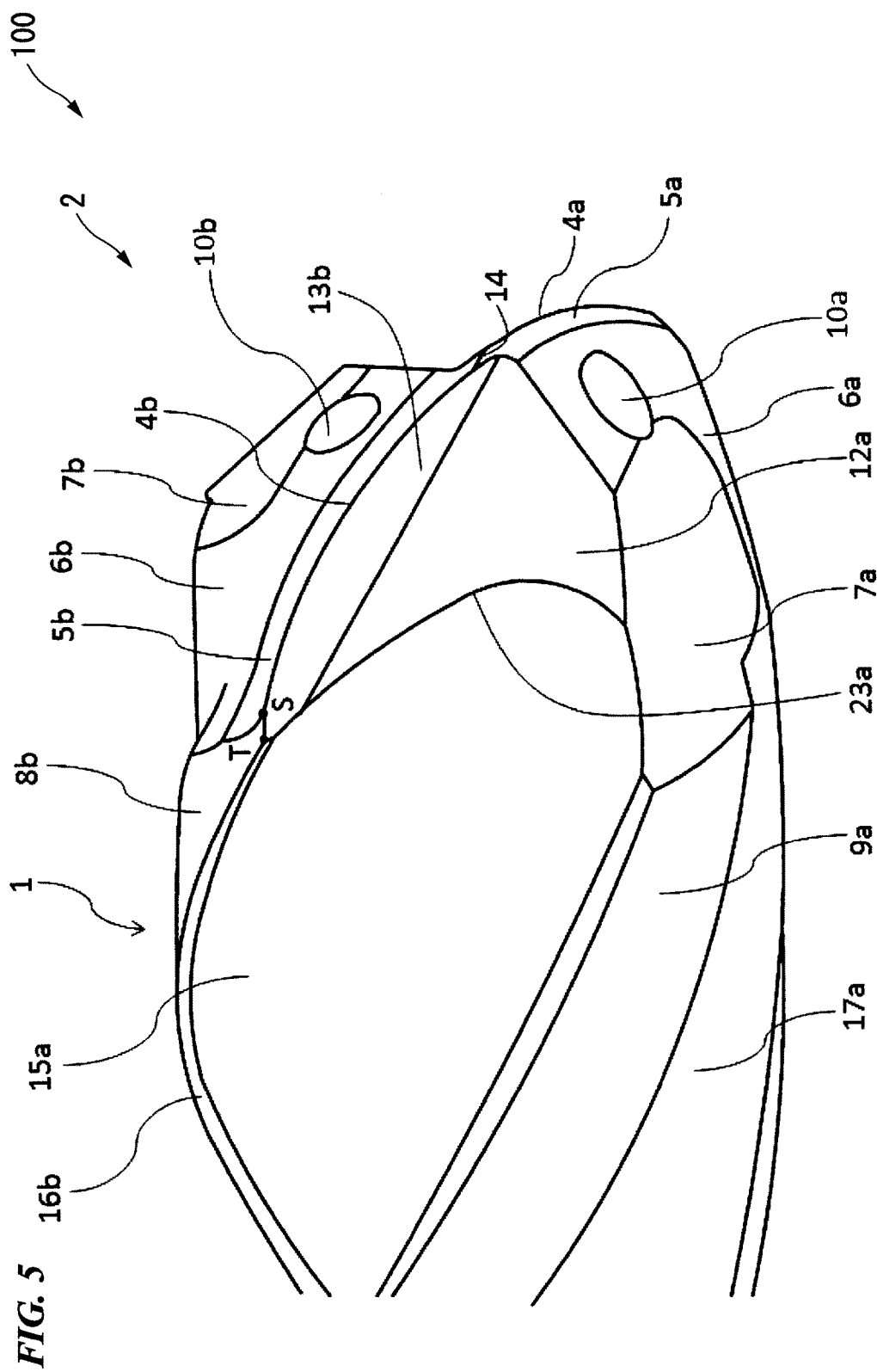
FIG. 5 is a perspective view when the drill of FIG. 3 is viewed at an angle different from that of FIG. 4.

Each of the thinnings 12b and 12a is provided on the forward side of each of the convex-arc cutting edges 4a and 4b in the rotational direction R. Specifically, each of the thinnings 12a and 12b is formed to be continuous with the forward side of each of the rake faces 13b and 13a in the rotational direction R and the back sides of each of the third faces 6a and 6b and each of the fourth faces 7a and 7b in the rotational direction R. As shown in FIGS. 1, 4, and 5, each of the thinnings 12a and 12b is connected to each of the second faces 5a and 5b near the chisel edge 14 and widths of the thinnings 12a and 12b in the rotational direction R increase from the tip side of the drill main body 1 toward the posterior end sides thereof.

Each of the flutes 15a and 15b is formed on the posterior end side of each of the thinnings 12a and 12b to be continuous with each of the thinnings 12a and 12b. Each of the flutes 15a and 15b spirally extends toward the posterior end side of the drill main body 1 at a predetermined helix angle.

Each of the first margins 8a and 8b is formed along the outer peripheral end W on the back side of each of the flutes 15a and 15b in the rotational direction R. As shown in FIG. 1, each of the first margins 8a and 8b is a convex curved surface formed along the outer peripheral end W which is a virtual cylindrical surface having a diameter D of the drill 100. More specifically, the forward ends of the first margins 8a and 8b in the rotational direction R are positioned on the outer peripheral end W, and the back ends of the first margins 8a and 8b in the rotational direction R are slightly separated from the outer peripheral end W toward the inside in the radial direction. Each of the first margins 8a and 8b spirally extends toward the posterior end side of the drill main body 1 along each of the flutes 15b and 15a. As shown in FIG. 3, the tip side of each of the first margins 8a and 8b in the direction of the rotational axis O is continuous with the posterior ends of each of the cutting edges 4a and 4b, each of the second faces 5a and 5b, and each of the third faces 6a and 6b.

Each of the second margins 9a and 9b is formed along the outer peripheral end W on the forward side of each of the flutes 15a and 15b in the rotational direction R. More specifically, as shown in FIG. 1, the back ends of the second margins 9a and 9b in the rotational direction R are positioned on the outer peripheral end W, and the forward ends of the second margins 9a and 9b in the rotational direction R are slightly separated from the outer peripheral end W toward the inside in the radial direction. Each of the second margins 9a and 9b is a convex curved surface which spirally extends toward the posterior end side of the drill main body 1 along each of the flutes 15a and 15b. As shown in FIGS. 2 and 4, the tip of each of the second margins 9a and 9b in the direction of the rotational axis O is continuous with the posterior end of each of the fourth faces 7a and 7b.

Body clearances 17a and 17b are formed between the first margins 8a and 8b and the second margins 9a and 9b so as to decrease a resistance during the cutting. More specifically, each of the body clearances 17a and 17b is formed to be continuous with the back side of each of the first margins 8a and 8b in the rotational direction R and the forward side of each of the second margins 9a and 9b in the rotational direction R. The body clearances 17a and 17b are positioned further inside in the radial direction than the first margins 8a and 8b and the second margins 9a and 9b, and are convex curved surfaces which spirally extend toward the posterior end side of the drill main body 1 between the first margins 8a and 8b and the second margins 9a and 9b along the first margins 8a and 8b and the second margins 9a and 9b.

As shown in FIGS. 2 and 5, negative lands 16a and 16b (16a is not shown in FIGS. 2 and 5) are formed along the first margins 8a and 8b and the flutes 15b and 15a between the first margins 8a and 8b and the flutes 15b and 15a in order to increase the strength of the first margins 8a and 8b, and the negative lands 16a and 16b are surfaces in which the angle with respect to the radial direction is negative. As shown in FIG. 1, heels 11a and 11b are formed along the second margin 9a and 9b and flutes 15b and 15a between the second margins 9a and 9b and the flutes 15a and 15b. The heels 11a and 11b are surfaces which are inclined with respect to the radial direction such that the inner ends thereof in the radial direction are positioned on the back sides of the outer ends thereof in the rotational direction R.

In this way, the heel 11a, the second margin 9a, the body clearance 17a, the first margin 8a, and the negative land 16a are continuously provided on the forward side of the flute 15a in the radial direction R in this order. The heel 11b, the second margin 9b, the body clearance 17b, the first margin 8b, and the negative land 16b are continuously provided on the forward side of the flute 15b in the radial direction R in this order.

The helix angle of each of the flutes 15a and 15b of the present embodiment can be appropriately selected from a range from 0° to 40° in accordance with a work material or machining conditions (the helix angle is 20° in the present embodiment). When deep hole drilling is performed on a hard material, preferably, the flutes 15a and 15b with a small helix angle are formed so as to secure rigidity. On a soft material, preferably, the flutes 15a and 15b having a large helix angle are formed so as to improve chip discharge performance.

Preferably, a maximum width G of each of the second faces 5a and 5b formed in an approximately band shape is formed within a range of 0.02D to 0.1D (D is the diameter of the drill 100), and more preferably, the maximum width G is formed within a range of 0.03D to 0.07D. Since the maximum width G is formed within the range of 0.02D to 0.1D, as shown in FIG. 3, compared with the conventional drill, it is possible to widen regions where the third faces 6a and 6b and the fourth faces 7a and 7b are formed (that is, regions between the second faces 5a and 5b and the thinnings 12a and 12b) and which are inclined to the posterior end side of the drill main body 1 at an angle which is larger than those of the second faces 5a and 5b. Accordingly, it is possible to further widen the chip discharge region compared with that in the conventional drill. In a case where the maximum width G is less than 0.02D, there is a concern that rigidity of the edge tip decreases. In a case where the maximum width G exceeds 0.1D, the chip discharge region is narrowed, and there is a concern that clogging of chips occurs frequently. Here, the "approximately band shape" means that the second faces 5a and 5b are formed such that the cutting edges 4a and 4b and the boundaries 27a and 27b between the second faces 5a and 5b and the third faces 6a and 6b are approximately parallel to each other (a difference between the maximum width and the minimum width of the second faces 5a and 5b is within 0.08D). In this case, each of the boundaries 27a and 27b between the second faces 5a and 5b and the third faces 6a and 6b can be selected from a straight line, a curved line, and a combination of a straight line and a curved line. In addition, the widths of the second faces 5a and 5b mean the widths of the second faces 5a and 5b in the rotational direction R.

As shown in FIGS. 1 and 3, each of the third faces 6a and 6b inclined to the posterior end side of the drill main body 1 at the third angle $\beta$ which is larger than the second angle $\alpha$, is formed on the back side of each of the second faces 5a and 5b in the rotational direction R. Each of the fourth faces 7a and 7b inclined to the posterior end side of the drill main body 1 at the fourth angle $\gamma$ which is larger than the third angle $\beta$, is formed on the back side of each of the third faces 6a and 6b in the rotational direction R. Since the drill 100 of the present embodiment includes the second faces 5a and 5b the third faces 6a and 6b, and the fourth faces 7a and 7b, it is possible to further increase the thicknesses of the cutting edges 4a and 4b on the tip portion 2 of the drill compared with those in the conventional drill. Accordingly, it is possible to secure a wider chip discharge region due to the fourth angle $\gamma$ having a large inclination angle, while improving the rigidity of the cutting edges 4a and 4b.

Here, each of the second faces 5a and 5b, the third faces 6a and 6b, and the fourth faces 7a and 7b may be a flat surface, a curved surface, and a combination surface of a flat surface and a curved surface, and when the curved surface is selected, preferably, a curved surface protruding toward the outside in the radial direction is used. In a case where a concave curved surface is used, rigidity of the drill is likely to decrease, and breaking is likely to occur.

In addition, preferably, the second angle α is 10° to 30°, the third angle β is 25° to 45°, and the fourth angle γ is 50° to 70° (here, α<β<γ). In a case where each of the angles α, β, and γ is lower than the lower limit of the numerical range, a resistance during cutting is likely to increase, and in a case where each of the angles α, β, and γ exceeds the upper limit of the numerical range, rigidity of the drill is likely to decrease. More preferably, the second angle α is 12° to 20°, the third angle β is 27° to 40°, and the fourth angle γ is 55° to 65° (here, α<β<γ).

Regarding the concave curved thinning 12a provided on the tip portion 2 of the drill of the present embodiment, in order to improve the chip discharge performance, as shown in FIG. 1, when the drill main body 1 is viewed from the tip side thereof, preferably, an angle θ between the cutting edge 4b and the boundary 20a between the thinning 12a and the third face 6a is 80° to 110°, and more preferably, is 85° to 100°. An angle θ between the cutting edge 4a and the boundary 20b between thinning 12b and the third face 6b is similar. In a case where the angle θ is less than 85°, the regions of the thinnings 12a and 12b are narrowed, and thus the chip discharge performance may decrease. In a case where the angle θ exceeds 110°, the second faces 5a and 5b and the third faces 6a and 6b are small, and there is a concern that rigidity decreases. In addition, the regions where the first and second margins 8a, 8b, 9a, and 9b are formed are narrowed, there is a concern that chattering easily occurs in the hole wall due to deterioration of guide performance.

As shown in FIG. 1, when the drill main body 1 is viewed from the tip side thereof, preferably, the boundary 20a between the thinning 12a and the third face 6a is formed in a straight-line shape. Since the boundary 20a is formed in a straight-line shape, chips are easily divided at the boundary 20a, and chip discharge performance is further improved. Chip division effects are exerted even when the boundary 20a is formed in a curved shape. However, when the boundary 20a is formed in a curved shape, the chip discharge performance is likely to be inferior compared with a case where the boundary 20a is formed in a straight-line shape. Similarly, preferably, the boundary 20b between the thinning 12b and the third face 6b is formed in a straight-line shape. In addition, in a case where the boundaries 20a and 20b are formed in curved shapes, angles between the cutting edges 4b and 4a and the straight lines which connect intersections between the boundaries 20a and 20b and the boundaries 21a and 21 and intersections between the boundaries 20a and 20b and the boundaries 27a and 27b, are regarded as the angles θ between the boundaries 20a and 20b and the cutting edges 4b and 4a.

As shown in FIG. 1, in a case where the drill main body 1 is viewed from the tip side thereof and a circle (core circle) U inscribed in the boundaries 23a and 23b between the thinnings 12a and 12b and the flutes 15a and 15b is drawn, preferably, a diameter (core diameter) Dw of the inscribed circle is 30 to 50% of the diameter D of the drill 100, and more preferably, is 35 to 45% of the diameter D. Since each of the cutting edges 4a and 4b of the drill 100 of the present embodiment is formed in a convex-arc shape, a resistance during cutting is likely to increase compared with the conventional drill in which the tip shape is approximately triangular. Accordingly, as described above, since the drill 100 has a relatively large core diameter, breaking of the drill 100 is prevented, and machining can be stably performed. In a case where the diameter Dw of the inscribed circle is less than 30% of the diameter D of the drill 100, breaking during cutting is likely to occur. In a case where the diameter Dw of the inscribed circle exceeds 50% of the diameter D of the drill 100, there is a concern that chip discharge performance decreases.

As shown in FIG. 1, when the drill main body 1 is viewed from the tip side thereof, preferably, an angle ε between the boundary 21a between the thinning 12a and the fourth face 7a and the boundary 20a between the thinning 12a and the third face 6a is 35° to 55°. Similarly, an angle ε between the boundary 21b between the thinning 12b and the fourth face 7b and the boundary 20b between the thinning 12b and the third face 6b is 35° to 55°. In a case where the angle ε is less than 35°, the thicknesses of the second margins 9a and 9b in the direction of the rotational axis O are thinned, and there is a concern that rigidities of the second margins 9a and 9b decrease. In a case where the angle ε exceeds 55°, the regions of the thinnings 12a and 12b are narrowed, and there is a concern that chip discharge performance decreases. In addition, in a case where the boundaries 20a and 20b are formed in curved shape, angles between the boundaries 21a and 21b and the straight lines which connect intersections between the boundaries 20a and 20b and the boundaries 21a and 21b and intersections between the boundaries 20a and 20b and the boundaries 27a and 27b, are regarded as the angles ε between the boundaries 20a and 20b and the boundaries 21a and 21b.

As shown in FIG. 1, when the drill main body 1 is viewed from the tip side thereof, preferably, a distance from the rotational axis O to a boundary point P between the thinning 12a and the fourth face 7a is within a range of 0.2D to 0.45D. The boundary point P is a point which is positioned at the outermost point in a radial direction on the boundary 21a between the thinning 12a and the fourth face 7a, that is, is an intersection between the fourth face 7a and the boundary 23a between the thinning 12a and the flute 15a. Since the thinning 12a is formed such that the boundary point P is positioned at the above-described position, it is possible to widen the thinning 12a while improving the strength of the second margin 9a. In a case where the distance between the boundary point P and the rotational axis O is less than 0.2D, the region of the thinning 12a is narrowed, and there is a concern that chip discharge performance decreases. In a case where the distance between the boundary point P and the rotational axis O exceeds 0.45D, the region of the thinning 12a excessively increases, the fourth face 7a is narrowed, and there is a concern that the rigidity decreases. Similarly, preferably, a distance from the rotational axis O to a boundary point P between the thinning 12b and the fourth face 7b is within a range of 0.2D to 0.45D. More preferably, the distance between the boundary point P and the rotational axis O is 0.30D to 0.40D.

As shown in FIG. 1, when the drill main body 1 is viewed from the tip side thereof, preferably, distances from the rotational axis O to boundary points Q between the thinnings 12a and 12b and the cutting edges 4b and 4a are within a range of 0.25D to 0.5D. The boundary points Q are points which are positioned at the outermost point in a radial direction on the boundary between the thinning 12a and 12b and the cutting edges 4a and 4b, that is, are intersections between the cutting edges 4a and 4b and the boundaries 23a and 23b between the thinnings 12a and 12b and the flutes 15a and 15b. Since the thinnings 12a and 12b are formed such that the boundary points Q are positioned at the above-described positions, it is possible to widen the thinnings 12a and 12b. In a case where the distances between the boundary points Q and the rotational axis O are less than 0.25D, the regions of the thinnings 12a and 12b are narrowed, and there is a concern that chip discharge performance decreases. More preferably, the distance between the boundary points Q and the rotational axis O are 0.30D to 0.40D.

Preferably, the second margins 9a and 9b of the drill 100 of the present embodiment are formed to be continuous with the posterior ends of the fourth faces 7a and 7b in the direction of the rotational axis O. According to this configuration, as shown in FIG. 2, since the thinnings 12a and 12b do not interfere with the beginning (tip in the direction of the rotational axis O) sides of the second margins 9a and 9b, it is possible to widen widths of the second margins 9a and 9b. As a result, stability during cutting is improved. In a case where the second margins 9a and 9b are formed to the third faces 6a and 6b, the widths of the second margins 9a and 9b are excessively widened, and there is a concern that a cutting resistance increases.

As shown in FIG. 5, preferably, a posterior end T in the rake face 13b of the drill 100 of the present embodiment in the direction of the rotational axis O is positioned at the posterior end side of the drill main body 1 with respect to a tip S of the first margin 8b in the direction of the rotational axis O. Since the above-described conditions are satisfied, the first margin 8b is positioned on the back side of the cutting edge 4b in the rotational direction R and the rake face 13b is positioned on the forward side of the cutting edge 4b in the rotational direction R between the posterior end T and the tip S (between TS). In other words, the terminal end of the rake face 13b is positioned on the back side of the beginning of the first margin 8b in the rotational direction R with respect to the cutting edge 4b as a boundary. When cutting is performed using the drill 100 in which the cutting edge 4b is formed between TS, the first margin 8b is in contact with the surface of the work material so as to rub the surface, and thus it is possible to obtain a hole machined surface with a high-quality by vanishing effects. Here, when the drill main body 1 is viewed from the tip side thereof, preferably, the distance between the tip S of the first margin 8b in the direction of the rotational axis O and the posterior end T of the rake face 13b in the direction of the rotational axis O is formed within a range of 0.03D to 0.3D. In a case where the distance is less than 0.03D, since the cutting edge 4b between TS is formed very small, it is not possible to obtain a higher-quality machined face. In a case where the distance exceeds 0.3D, the formation region of the second face 5b decreases, and there is a concern that a cutting resistance increases. More preferably, the distance is 0.05D to 0.15D. In addition, this is similarly applied to the rake face 13a and the first margin 8a.

In FIG. 3, preferably, the width (the width in the rotational direction R) of the first margin 8a gradually increases from the tip S of the first margin 8a in the direction of the rotational axis O to the posterior end X of the third face 6a in the direction of the rotational axis O (the posterior end of the boundary 26 between the first margin 8a and the third face 6a in the direction of the rotational axis O). Since the width of the first margin 8a is configured as described above, it is possible to decrease a load during cutting. In addition, as shown in FIG. 3, since a boundary 25 between the first margin 8a and the second face 5a and a boundary 26 between the first margin 8a and the third face 6a are formed in convex-arc shapes toward the forward side in the rotational direction R, it is possible to further decrease a cutting load. In addition, these are similarly applied to the width of the first margin 8b, the boundary between the first margin 8b and the second face 5b, and the boundary between the first margin 8b and the third face 6b.

FIG. 6 is a sectional view (a sectional view taken along line I-I of FIG. 3) orthogonal to the rotational axis O at a position separated by 0.15D from the tip 50 of the drill 100 toward the posterior end of the drill main body 1 in the direction of the rotational axis O. In the drill 100 of the present embodiment, within a range of 0.03D to 0.35D from the tip 50, a radial rake angle δ is preferably −5° to −0.5° in order to secure the rigidity of the edge tip. In a case where the radial rake angle δ is set to be more than −0.5°, there is a concern that rigidity of the edge tip is insufficient and chipping occurs. In a case where the radial rake angle δ is set to a negative angle more than −5°, a cutting resistance is likely to increase. More preferably, the radial rake angle δ is −4° to −1°.

Hereinbefore, the drill according to the embodiment of the present invention is described. However, the present invention is not limited to this and can be appropriately modified within a scope which does not depart from the technical idea of the present invention. In the embodiment, the drill having two cutting edges is described. However, the present invention is not limited to this. Even in a case where the number of cutting edges is three or four, according to the above-described configuration, the effects of the present invention can be exerted. In addition, in this case, the shape of the drill main body may be rotationally symmetric with respect to the rotational axis by 120° or 90°.

INDUSTRIAL APPLICABILITY

According to the drill of the present invention, since high chip discharge performance can be obtained while the rigidity of the edge tip is secured, it is possible to obtain a high-quality machined face in drilling.

REFERENCE SIGNS LIST

100: DRILL
1: DRILL MAIN BODY
2: TIP PORTION OF DRILL MAIN BODY
4a, 4b: CONVEX-ARC CUTTING EDGE
5a, 5b: SECOND FACE
6a, 6b: THIRD FACE
7a, 7b: FOURTH FACE
8a, 8b: FIRST MARGIN (OUTER PERIPHERAL END OF BACK SIDE OF FLUTES 15a AND 15b IN ROTATIONAL DIRECTION R)
9a, 9b: SECOND MARGIN (OUTER PERIPHERAL END OF FORWARD SIDE OF FLUTES 15a AND 15b IN ROTATIONAL DIRECTION R)
10a, 10b: OIL HOLE
11a, 11b: HEEL
12a, 12b: THINNING
13a, 13b: RAKE FACE
14: CHISEL EDGE
15a, 15b: FLUTE
16a, 16b: NEGATIVE LAND
17a, 17b: BODY CLEARANCE
20a, 20b: BOUNDARY BETWEEN THINNING AND THIRD FACE
21a, 21b: BOUNDARY BETWEEN THINNING AND FOURTH FACE
23a, 23b: BOUNDARY BETWEEN THINNING AND FLUTE
25: BOUNDARY BETWEEN SECOND FACE AND FIRST MARGIN
26: BOUNDARY BETWEEN THIRD FACE AND FIRST MARGIN 27a, 27b: BOUNDARY BETWEEN SECOND FACE AND THIRD FACE
50: TIP OF DRILL MAIN BODY
100: DRILL
D: DIAMETER OF DRILL
Dw: CORE DIAMETER
G: WIDTH OF SECOND FACE
O: ROTATIONAL AXIS
P: BOUNDARY POINT BETWEEN THINNING AND FOURTH FACE
Q: BOUNDARY POINT BETWEEN THINNING AND CUTTING EDGE
R: ROTATIONAL DIRECTION
S: BEGINNING (TIP IN DIRECTION OF ROTATIONAL AXIS) OF FIRST MARGIN
T: TERMINAL END (POSTERIOR END IN DIRECTION OF ROTATIONAL AXIS) OF RAKE FACE
U: CORE CIRCLE
X: TERMINAL END (POSTERIOR END IN DIRECTION OF ROTATIONAL AXIS) OF THIRD FACE
W: OUTER PERIPHERAL END
α: SECOND ANGLE
β: THIRD ANGLE
γ: FOURTH ANGLE
δ: RAKE ANGLE
ε: ANGLE BETWEEN BOUNDARY BETWEEN THINNING AND THIRD FACE AND BOUNDARY BETWEEN THINNING AND FOURTH FACE
θ: ANGLE BETWEEN CUTTING EDGE AND BOUNDARY BETWEEN THINNING AND THIRD FACE

The invention claimed is:

1. A drill comprising: a drill main body; a plurality of convex-arc cutting edges which are formed on a tip side of the drill main body from an outer periphery of the drill main body to a chisel edge provided near to a rotational axis, each of convex-arc cutting edges extending in a convex-arc shape from an outer periphery of the tip to the chisel edge on a virtual plane parallel to the rotational axis; rake faces formed on a forward side of each of the convex-arc cutting edges in a rotational direction, each of the rake faces being a flat face which is surrounded by each of the convex-arc cutting edges on the virtual plane; thinnings which are each formed between the convex-arc cutting edges; flutes which are each formed from a posterior end of each of the thinnings in a direction of the rotational axis toward a posterior end side of the drill main body; first margins which are each formed along an outer peripheral end of the drill main body on a back side of each of the flutes in s the rotational direction; and second margins which are each formed along the outer peripheral end of the drill main body on a forward side of each of the flutes in the rotational direction, wherein the drill further comprises: second faces which are each formed in an approximately band shape and are each formed along each of the convex-arc cutting edges on a back side of the convex-arc cutting edge in the rotational direction; third faces which are each formed to be continuous with a back side of each of the second faces in the rotational direction; and fourth faces which are each formed to be continuous with a back side of each of the third faces in the rotational direction.

2. The drill according to claim 1, wherein a maximum width of each of the second faces which are formed in an approximately band shape is within a range of 0.02D to 0.1D, where D is a diameter of the drill.

3. The drill according to claim 2, wherein, in a case where the drill main body is viewed from the tip side thereof, each of boundaries between the thinnings and the third faces forms an angle of 80° to 110° with respect to each of ridgelines of the convex-arc cutting edges.

4. The drill according to claim 2, wherein, in a case where the drill main body is viewed from the tip side thereof, each of boundaries between the thinnings and the third faces forms an angle of 80° to 110° with respect to each of ridgelines of the convex-arc cutting edges.

5. The drill according to claim 2, wherein, in a case where the drill main body is viewed from the tip side thereof, boundaries between the thinnings and the third faces are formed in straight lines.

6. The drill according to claim 2, wherein a radial rake angle (δ) is −5° to 0.5° formed between a radial direction perpendicular to the rotational axis and each of the convex-arc cutting edges; and
wherein a second angle (α) is 10° to 30° formed between a face perpendicular to the rotational axis and each of the second faces, a third angle (β) is 25° to 45° formed between a face perpendicular to the rotational axis and each of the third faces, and a fourth angle (γ) is 50° to 70° formed between a face perpendicular to the rotational axis and each of the fourth faces.

7. The drill according to claim 1, wherein a radial rake angle (δ) is −5° to 0.5° formed between a radial direction perpendicular to the rotational axis and each of the convex-arc cutting edges; and
wherein a second angle (α) is 10° to 30° formed between a face perpendicular to the rotational axis and each of the second faces, a third angle (β) is 25° to 45° formed between a face perpendicular to the rotational axis and each of the third faces, and a fourth angle (γ) is 50° to 70° formed between a face perpendicular to the rotational axis and each of the fourth faces.

8. The drill according to claim 1, wherein, in a case where the drill main body is viewed from the tip side thereof, each of boundaries between the thinnings and the third faces forms an angle of 80° to 110° with respect to each of ridgelines of the convex-arc cutting edges.

9. The drill according to claim 1, wherein, in a case where the drill main body is viewed from the tip side thereof, boundaries between the thinnings and the third faces are formed in straight lines.

10. The drill according to claim 1, wherein a terminal end of the rake face of each of the convex-arc cutting edges is positioned on a back side of a beginning of each of the first margins in the rotational direction.

11. The drill according to claim 1, wherein, in a case where the drill main body is viewed from the tip side thereof, a diameter of a circle inscribed in boundaries between the thinnings and the flutes is 30% to 50% of a diameter of the drill.

12. The drill according to claim 1, wherein a tip side of each of the thinnings is continuous with the back side of each of the third faces in the rotational direction,
wherein a posterior end side of each of the thinnings is continuous with a back side of each of the fourth faces in the rotational direction, and wherein in a case where the drill main body is viewed from the tip side thereof, each of boundaries between the thinnings and the third faces forms an angle of 35° to 55° with each of boundaries between the thinnings and the fourth faces.

13. The drill according to claim 1,
wherein each of the thinnings is continuous with a back side of each of the fourth faces in the rotational direction, and
wherein in a case where the drill main body is viewed from the tip side thereof, a distance from the rotational axis to an outermost point in a radial direction which is located on boundaries between the thinnings and the fourth faces is 0.2D to 0.45D, where D is a diameter of the drill.

14. The drill according to claim 1,
wherein in a case where the drill main body is viewed from the tip side thereof, the distance from the rotational axis to the outermost point in a radial direction which is located on the boundaries between the thinnings and the convex-arc cutting edges is 0.25D to 0.5D, where D is a diameter of the drill.

15. The drill according to claim 1,
wherein each of the second margins is continuous with a posterior end of each of the fourth faces in the direction of the rotational axis.

16. The drill according to claim 1,
wherein, in the direction of the rotational axis, a posterior end of a rake face of each of the convex-arc cutting edges is positioned at the posterior end side of the drill main body with respect to a tip of each of the first margins.

17. The drill according to claim 16,
wherein in a case where the drill main body is viewed from the tip side thereof, a distance between the posterior end of the rake face in the direction of the rotational axis and the tip of each of the first margins in the direction of the rotational axis is 0.03D to 0.3D, where D is a diameter of the drill.

18. The drill according to claim 1,
wherein each of the first margins is continuous with a posterior end of each of the third faces in the direction of the rotational axis, and
wherein a width of each of the first margins is gradually increased from a tip of each of the first margins in the direction of the rotational axis to a posterior end of each of boundaries between the first margins and the third faces in the direction of the rotational axis.

19. The drill according to claim 1,
wherein each of the first margins is continuous with a posterior end of each of the second faces and a posterior end of each of the third faces in the direction of the rotational axis, and
wherein boundaries between the first margins and the second faces and boundaries between the first margins and the third faces are circular arcs which are convex forward in the rotational direction.

20. The drill according to claim 1,
wherein a rake angle of each of the convex-arc cutting edges is −5° to 0.5° in a range of 0.03D to 0.35D in the direction of the rotational axis from a tip of the drill main body, where D is a diameter of the drill.

* * * * *